Figure 1:
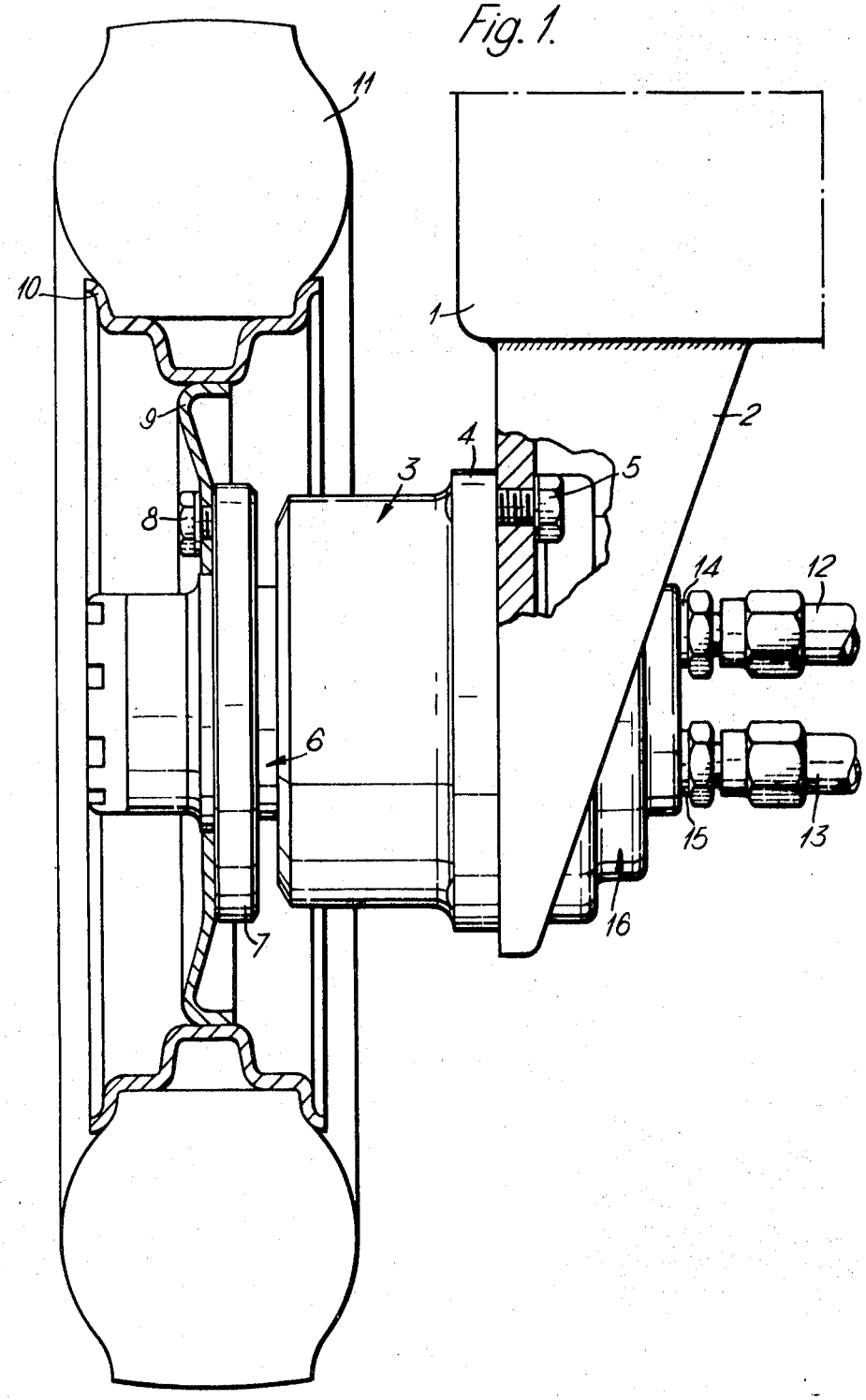

United States Patent
Nielsen

[15] 3,653,454

[45] Apr. 4, 1972

[54] WHEEL-DRIVE SYSTEM INCORPORATING A HYDRAULIC MOTOR

[72] Inventor: Soren Nielsen, Hinnerup, Denmark

[73] Assignee: Danfoss A/S, Nordborg, Denmark

[22] Filed: Apr. 8, 1970

[21] Appl. No.: 26,654

[30] Foreign Application Priority Data

May 5, 1969 Germany......................P 19 22 832.1

[52] U.S. Cl............................................................180/66 F
[51] Int. Cl.............................................................B60k 7/00
[58] Field of Search............................180/43 B, 66 F, 66, 75

[56] References Cited

UNITED STATES PATENTS 2,353,730  7/1944  Joy........................................180/66 F
2,523,014  9/1950  Gooch............................180/66 F UX
2,679,300  5/1954  Nubling....................................180/66

Primary Examiner—A. Harry Levy
Attorney—Wayne B. Easton

[57] ABSTRACT

The invention relates to a wheel drive system incorporating a hydraulic motor of the toothed wheel type. The motor portion comprises a rotating casing and a stationary shaft member. The motor casing is rotatably journalled in a hub member and the casing has a flange to which a ground engaging wheel may be attached. Expanding and contracting chambers are formed by relative movement between a toothed ring member which is fixedly attached to the casing for rotation therewith and surrounds a toothed wheel member, the ring member being rotatable about its own axis and the toothed wheel member is capable of only orbital movement about the ring axis. The casing and shaft member having cooperating fluid passages for feeding and exhausting the expanding and contracting chambers.

6 Claims, 2 Drawing Figures

WHEEL-DRIVE SYSTEM INCORPORATING A HYDRAULIC MOTOR

The invention relates to a wheel-drive means incorporating a hydraulic motor and employing a gudgeon and a hub surrounding it.

It is known to drive a wheel by means of a single hydraulic motor and, in order to save space, to arrange this motor concentrically with the wheel. In this arrangement, the hydraulic motor is combined with the wheel bearing. The consequence of this is that those forces that are transmitted from the wheel to the chassis are passed through the motor. This results in a number of difficulties particularly when the vehicles are heavy ones and large forces have to be transmitted, and when the hydraulic motor is intended to impart a slow speed of rotation to the wheel under high torque.

Usually the motor casing is non-rotatably connected to the chassis and acts as a fixed gudgeon on which the wheel is mounted by means of a hub. Torque is transmitted from the motor shaft to the rim of the wheel through a gear which usually also acts as a reduction unit. The construction is complicated by this reduction gear and its axial length is great.

It is also known to use the shaft of the motor as a stationary gudgeon, connected to the chassis, and to use the motor casing as a rotating hub to which the rim of the wheel is directly secured. A mounting system of this kind is not however very stable since the gudgeon, through which all the forces have to be passed, has a relatively small diameter. Moreover, the motor is not only loaded by the torque that has to be produced, but also by all the radial forces that have to be transmitted from the wheel to the chassis.

The object of the invention is to provide a wheel-drive means of the initially described kind which, while being of simple construction, enables a safe mounting arrangement to be obtained.

According to the invention, this object is achieved by the hub being stationary and the gudgeon being connected to the rim of the wheel, by the gudgeon constituting, at least partially, the motor casing, and by the shaft of the motor being non-rotatably connected to the hub.

In this construction, the motor constitutes a gudgeon of relatively large diameter, which is mounted by its exterior in a hub solid with the housing. Consequently, there is obtained a stable mounting through which all the radial loads from the wheel are deflected directly to the chassis. The motor itself, the remaining parts of which can be accommodated within the gudgeon, thus only has to provide the torque. A non-rotatable connection between the shaft of the motor and the hub involves no difficulties at all as regards construction. In all, the space available is properly utilized. In particular, the wheel-drive means is suitable for heavy vehicles, the wheels of which have to be driven slowly.

The gudgeon can enclose at least some parts of a reduction arrangement. Since, for reasons of effecting a safe mounting, the gudgeon must extend over a certain axial length into the hub, the accommodation of the reduction arrangement generally causes no difficulties.

Particularly advantageous in this connection is the use of a toothed-wheel motor, known per se, comprising a toothed ring, surrounding a toothed wheel, and a device for compensating the movement of the toothed wheel over a circular path, the toothed ring being firmly secured to the gudgeon and the toothed wheel being connected to the stationary motor shaft by way of the compensating device. These motors have proved reliable in many instances in practice. They offer the advantage that the r.p.m. of the driven side is already considerably reduced as compared with the speed of the chambers between the teeth which increase and diminish in size. Moreover, all the parts of the motor, or the important parts thereof, can be accommodated without difficulty within one gudgeon.

A considerable advantage is achieved if the compensating device takes the form of a universal-joint shaft, known per se. Although the universal-joint shaft increases the axial length of the motor, this is however just what is required in view of the required length of the gudgeon.

In a preferred embodiment, the gudgeon has at that of its ends opposite the shaft outlet point, a flange for securing the rim, and toothed elements are located near the flange. In this construction, the torque is produced in approximately the same plane in which it should be transmitted to the wheel. The toothed elements can be readily replaced; after they have been removed, the other parts of the motor are accessible. The interior of the gudgeon then needs to be only of such size that it can accommodate the motor shaft and, possibly, a universal-joint shaft.

In another preferred embodiment, the stationary shaft of the motor contains a supply and a discharge passage. Furthermore, the stationary motor shaft can constitute part of a switching valve known per se. Expediently, the gudgeon then forms the other part of the switching valve and contains passages which lead to the chambers of the toothed-wheel motor. In this way a relatively long gudgeon is provided which enables the wheel to be mounted in a safe manner.

Furthermore, a distance sleeve, surrounding the universal-joint shaft, can be disposed between the toothed wheel and the stationary part of the switching valve. Despite the considerable length of the gudgeon, that part of the motor shaft acting as the switching valve can be reduced in length by this distance sleeve, and this reduces the losses due to friction.

It is advisable to fit between the hub and the gudgeon two spaced-apart roller bearings, particularly tapered roller bearings, to take up the axial and radial forces, the inner ring of one of the bearings being supported on the flange by way of a distance sleeve and the outer ring of this bearing being supported on the hub with the help of a first circlip, while the outer ring of the other bearing is supported on the first circlip by way of a distance sleeve, and the inner ring of this bearing is supported on the gudgeon with the help of a second circlip. In this way the hub and the gudgeon are securely located relatively to each other.

In this arrangement, the space containing the bearings can be closed and sealed at both sides and can communicate through passages in the gudgeon with a space within the gudgeon in which the oil leaking from the motor collects. The bearings are then automatically lubricated by the leakage oil.

The space containing the bearings can be connected to the delivery and discharge pipes by way of non-return valves. This then ensures that no compressed oil finds its way into the bearing chamber; instead the leakage oil can always only flow away towards the low-pressure side.

The space containing the bearings is advantageously closed, on that side remote from the flange, by an insert which provides the non-rotatable connection between the hub and the shaft of the motor, which connection incorporates unions for the supply and discharge pipes and contains the leakage-oil passages containing the non-return valves. This results in a particularly simple construction.

The insert is preferably of three parts, the first of which is secured to the hub and extends beyond the end of the gudgeon, the second of which is of disc form and is fitted on the first part, surrounds the end of the motor shaft and, by means of inner teeth, meshes with corresponding teeth on the motor shaft, and the third of which forms a stop surface for the end-face of the motor shaft at which the supply and discharge passages terminate and incorporates unions and passages which connect them with the ends of the passages in the end-face of the shaft and which also contain the non-return valves. It is thus ensured that the insert can be easily manufactured and that it nevertheless accurately fulfils all the functions required of it. In particular, the leakage oil can be passed through the insert without interfering with the supply and discharge passages.

A further advantageous details is constituted by the fact that an axial needle bearing is fitted between the distance sleeve and that end-face of the motor shaft presented to the universal-joint shaft, this needle bearing forming part of the leakage-oil passage running to the chamber containing the bearings.

Figure 2:
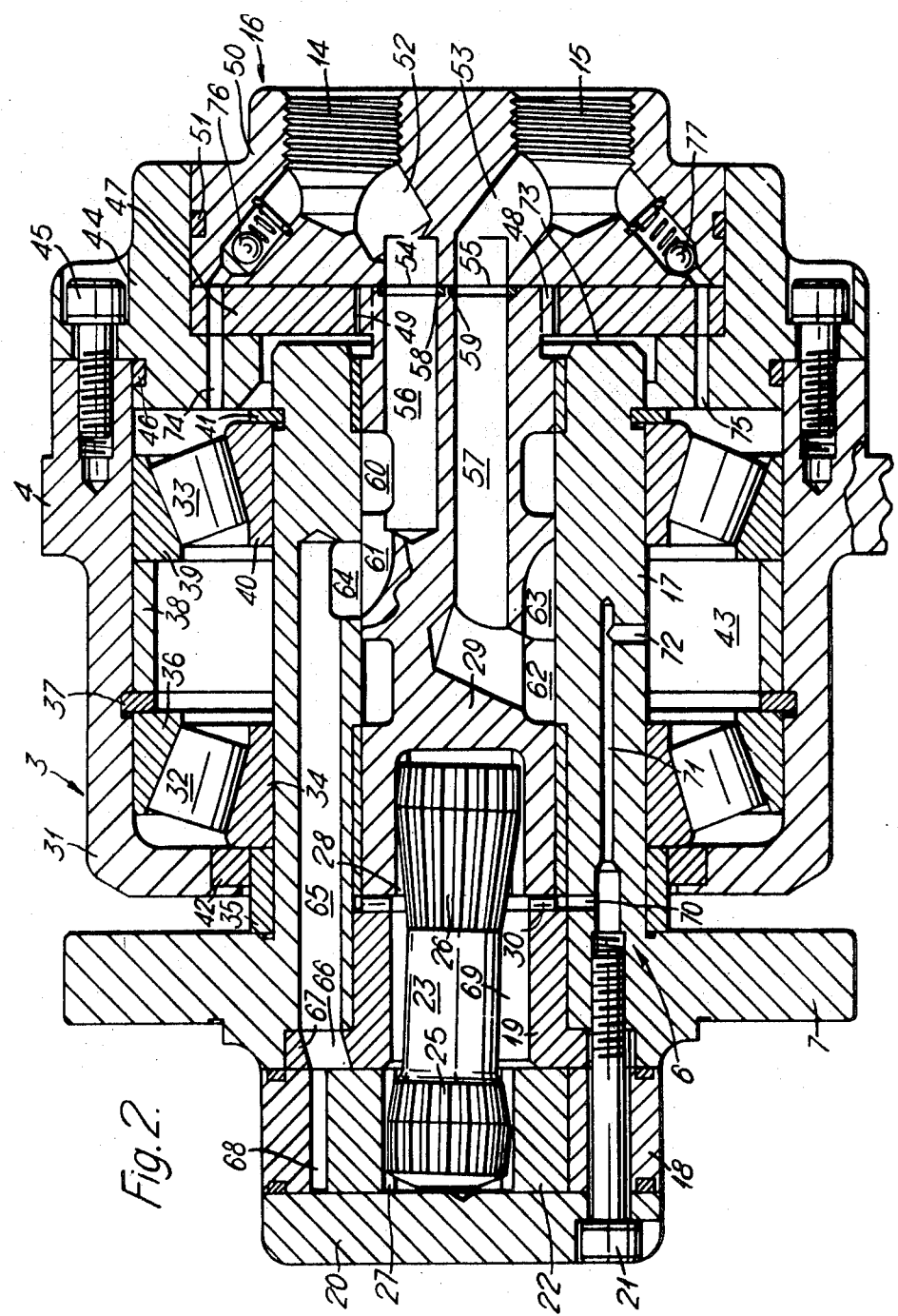

The invention will now be described in more detail by reference to an embodiment illustrated in the drawing, in which:

FIG. 1 shows a side view, partly in section, of a wheel-drive means according to the invention, and FIG. 2 shows a longitudinal section through the important parts of the mounting and of the motor.

FIG. 1 shows a part 1 of the chassis, to which, with the help of a bracket 2, there is secured a hub 3. The hub has a flange 4, which is secured to the bracket 2 with the help of screw-bolts 5. Mounted in the hub 3 is a gudgeon 6, which has a flange 7 to which there is attached, with the help of screw-bolts 8, a wheel disc 9 having a rim 10 for accommodating a tire 11. The gudgeon 6 is part of a hydraulic motor (see FIG. 2), which is connected to a compressed-liquid supply by means of two pipes 12 and 13. The pipes are connected to unions 14 and 15, which are accommodated in an insert 16 connected to the hub 3.

As shown in FIG. 2, the gudgeon 6 is composed of the rotating casing 17 of the hydraulic motor having a flange 7 integral therewith, an internally toothed ring 18 of the motor, a distance sleeve 19 and a closure plate 20, these parts being interconnected by screw-bolts 21.

An externally toothed wheel 22, which has one tooth fewer than the toothed ring 18, is secured against rotation with the help of a universal-joint shaft 23, but its center is able to move over a circular path. The universal-joint shaft 23 has two toothed heads 25 and 26. The head 25 meshes with a toothed cavity 27 in the toothed wheel 22, and the head 26 meshes with a toothed cavity 28 in stationary motor shaft 29. This is backed by the distance sleeve 19 by way of an axial needle bearing 30.

The hub 3 has a body 31, which, with the help of two tapered roller bearings 32 and 33, transmits the axial and radial wheel forces from the gudgeon 6 to the chassis 1. To secure the mounting, the inner ring 34 of the first bearing 32 is supported on the flange 7 though a distance sleeve 35, while the outer ring 36 of this bearing is held in position on the hub body 31 with the help of a first "circlip" 37. A further distance sleeve 38 holds the outer ring 39 of the second bearing 33 in position, while the inner ring 40 of this bearing is secured to the gudgeon by a second "circlip" 41. A sealing ring 42 tightly seals the space 43, containing the bearings, at the gudgeon outlet side. At the opposite side, the chamber 43 is sealed by the insert 16. This has a first part 44, which is secured to the hub body 31 by means of screw-bolts 45, and extends axially beyond the end of the gudgeon, i.e., the casing 17, a sealing ring 46 being provided. A second part 47, which is attached to the part 44 by means of screw-bolts (not illustrated) has an inner toothed part 48 which co-operates with an outer toothed part 49 on the stationary motor shaft 29 and in this way interconnects the hub 3 and the shaft 29 so that they cannot rotate relatively to each other. A third part 50, which is held in the part 44 with the help of a sealing ring 51 and is secured to the part 44 by the same screw-bolts used for securing the second part 47 to the part 44, carries the two unions 14 and 15 and contains connecting passages 52 and 53, which lead to openings 54 and 55 provided in the end-face presented to the shaft 29.

Within the stationary shaft 29 are supply and discharge passages 56 and 57, which are connected to the openings 54 and 55, sealing elements 58 and 59 being interposed. Associated with the passage 56 is an annular groove 60, with which axial grooves 61 communicate, and associated with the passage 57 is an annular groove 62, with which axial grooves 63 communicate. The axial grooves 61 and 63 alternate with each other; their number in each case corresponds to the number of teeth on the toothed wheel 22. These axial grooves 61 and 63 co-operate with openings 64 in the casing 17, which openings each lead to the floor of the gap between adjacent teeth on the ring 18, by way of longitudinal passages 65 and inclined bores 66 in a flange 67 on the spacing sleeve 19. The number of openings 64 therefore corresponds to the number of teeth on the ring 18. In this way, the chambers 68 formed between the toothed ring and the toothed wheel are each supplied with liquid under pressure in the correct sequence, i.e., are connected to the low-pressure side.

If compressed liquid is passed through the union 14, the casing 17 rotates in one direction, and if compressed fluid is passed through the union 15 the casing rotates in the other direction and so does the driven wheel therefore. The oil emerging from the chambers 68 between the teeth collects in a centrally disposed space 69 and can pass into the space 43 accommodating the bearings 32 and 33, by way of the axial needle bearing 30, a first transverse bore 70, a longitudinal bore 71 and a second longitudinal bore 72. The bearings are lubricated by the leakage oil in this space 43. Leakage oil which forces its way from the annular groove 62 along the circumferential face of the shaft 29 also flows over the needle bearings 30. Oil which travels from the annular groove 60 along the circumference of the shaft likewise finds its way into the space 43 by way of a gap 73 at the end-face. The space 43 communicates with the passages 52 and 53 by way of two passages 74 and 75, which extend through all three parts 44, 47 and 50 of the insert and which each contain a non-return valve 76 and 77. The non-return valves each open towards the unions 14 and 15, so that leakage oil can in each case flow towards the low-pressure side.

I claim:

1. A wheel drive system comprising a hydraulic motor having a rotatable casing and a stationary shaft member, a stationary hub member in which said casing is rotatably journalled, flange means on said casing to which a ground engaging wheel may be attached, said motor being of the toothed wheel type comprising a toothed ring surrounding a toothed wheel, said ring being fixedly attached to said casing for rotation therewith, compensating means connecting said toothed wheel to said shaft member for allowing only orbital movement of said toothed wheel relative to said shaft member, said compensating means being a universal-joint shaft.

2. A wheel drive system according to claim 1 wherein the respective planes of said toothed ring and said flange means are in closely spaced relation.

3. A wheel drive system according to claim 1 wherein relative movement between said toothed ring and said toothed wheel form expanding and contracting chambers, said casing and said shaft member having cooperating fluid passage means for feeding and exhausting said chambers.

4. A wheel drive system according to claim 1 including a pair of spaced-apart tapered bearings between said casing and said hub member, one of said bearings having the inner ring thereof in effective abutting engagement with said flange means.

5. A wheel drive system according to claim 4 wherein a generally annularly shaped space is formed between said hub and said casing in which said bearings are disposed, said casing defining a central bore through which said universal-joint shaft extends, drain passages in said casing from said central bore to said space through which leakage oil from said expanding chambers is routed.

6. A wheel drive system according to claim 5 including a header fixedly attached to said stationary shaft, inlet and outlet ports in said header, parallel return passages in said casing and said header extending from said space respectively to said inlet and outlet ports, and check valve means in said return passages allowing fluid to flow from said space into said ports.

* * * * *